United States Patent
Niepceron et al.

(10) Patent No.: US 11,480,109 B2
(45) Date of Patent: Oct. 25, 2022

(54) REDUCTION GEAR FOR RING GEAR RETENTION

(71) Applicant: SAFRAN TRANSMISSION SYSTEMS, Colombes (FR)

(72) Inventors: Clément Paul René Niepceron, Moissy-Cramayel (FR); Marc Dominique Seyfrid, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/448,074

(22) Filed: Sep. 20, 2021

(65) Prior Publication Data

US 2022/0090540 A1 Mar. 24, 2022

(30) Foreign Application Priority Data

Sep. 23, 2020 (FR) ..................................... 20 09657

(51) Int. Cl.
*F16H 55/17* (2006.01)
*F02C 7/36* (2006.01)
*F16H 57/08* (2006.01)

(52) U.S. Cl.
CPC ............... *F02C 7/36* (2013.01); *F16H 55/17* (2013.01); *F16H 57/08* (2013.01);
(Continued)

(58) Field of Classification Search
CPC ..................................... F02C 7/36; F02C 7/06
See application file for complete search history.

(56) References Cited

U.S. PATENT DOCUMENTS 5,871,415 A   2/1999  Fuehrer et al.
8,511,987 B2 * 8/2013  Reinhardt ............. F01D 25/162
                                                    415/229
(Continued)

FOREIGN PATENT DOCUMENTS

EP   0 791 148 B1   1/1999
FR   3 092 889 A1   8/2020

OTHER PUBLICATIONS

French Preliminary Search Report dated Jun. 7, 2021 in French Application 20 09657 filed on Sep. 23, 2020, 7 pages (with English Translation of Categories of Cited Documents & Written Opinion).

*Primary Examiner* — Derek D Knight
(74) *Attorney, Agent, or Firm* — Oblon, McClelland, Maier & Neustadt, L.L.P.

(57) ABSTRACT

A reduction gear for a turbomachine (6) extending around an axis (X-X) of rotation, comprising a ring gear (9) connected to a ring gear carrier (12), wherein the ring gear carrier (12) has, according to a section view along a plane including the axis (X-X), an internal segment (124), an external segment (126) and a ring gear support (128), extending successively from the internal shaft (122) until the ring gear support (128), the internal segment (124) extends until a radius R1 with respect to the axis (X-X), the external segment (126) forms an angle β with the internal segment (124), the ring gear support (128) forms an angle α with the external segment (126), and is secured to the ring gear (9) via a bolted connection accomplished at a nominal radius R2 with respect to the axis (X-X), in that the ratio R1/R2 is comprised between 0.3 and 0.7.

9 Claims, 2 Drawing Sheets

(52) U.S. Cl.
CPC .......... *F05D 2220/323* (2013.01); *F05D 2260/4031* (2013.01); *F16H 2055/176* (2013.01)

(56) References Cited

U.S. PATENT DOCUMENTS

| | | | |
|---|---|---|---|
| 8,690,721 B2 * | 4/2014 | McCune | F16H 57/043 475/159 |
| 8,911,203 B2 * | 12/2014 | Reinhardt | F02K 3/06 415/124.2 |
| 8,968,148 B2 * | 3/2015 | Matsuoka | F16H 1/2818 475/331 |
| 11,131,249 B2 * | 9/2021 | Di Giovanni | F16C 19/54 |
| 2011/0299974 A1 | 12/2011 | Gauthier et al. | |
| 2020/0300173 A1 | 9/2020 | Simon et al. | |

\* cited by examiner

[Fig. 1]
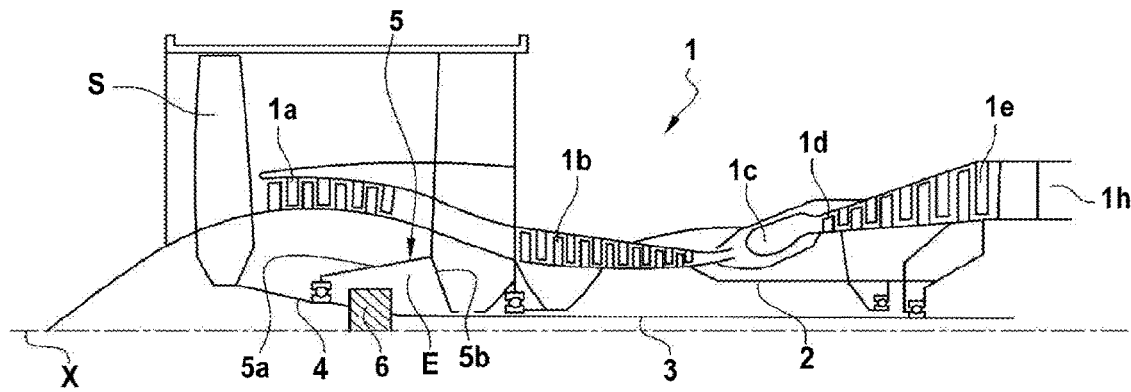
[Fig. 2]
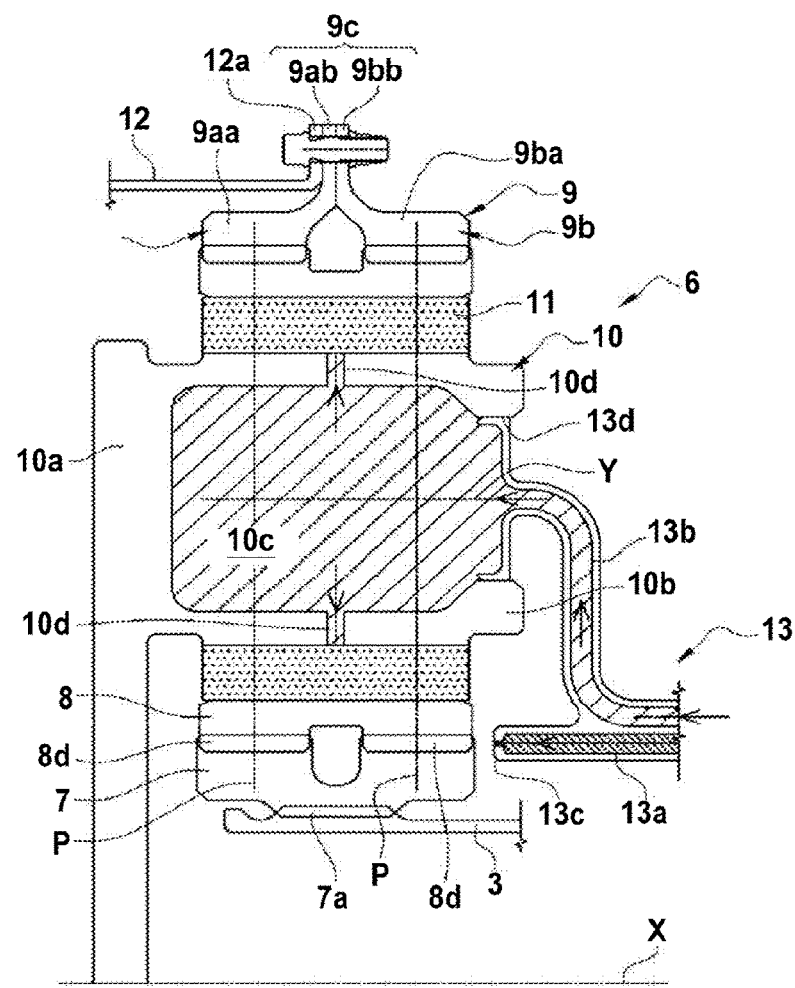

[Fig. 3]
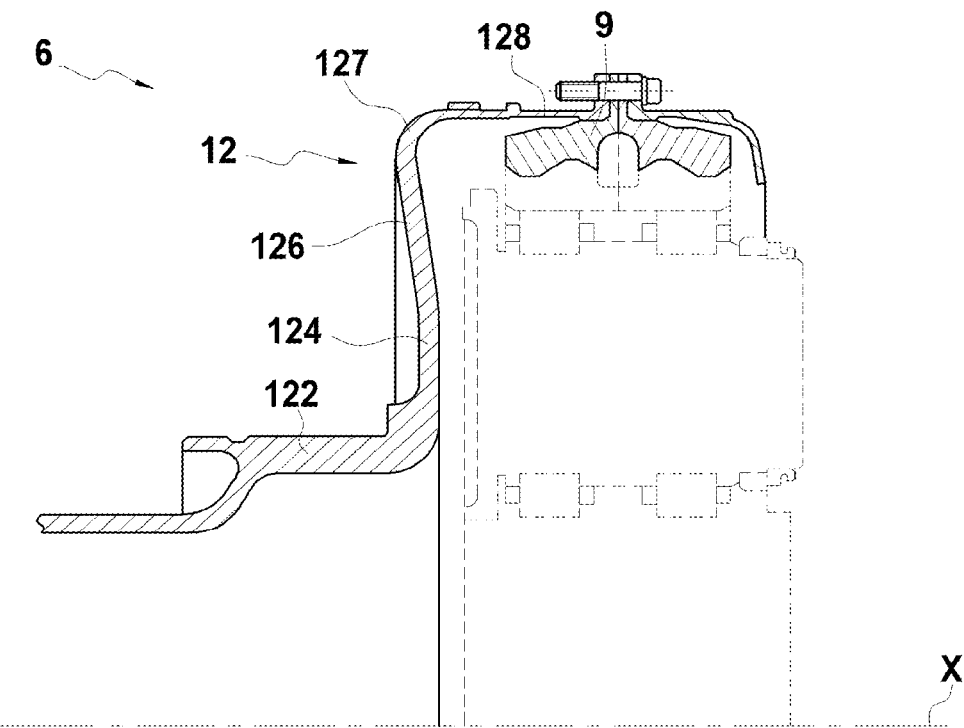
[Fig. 4]
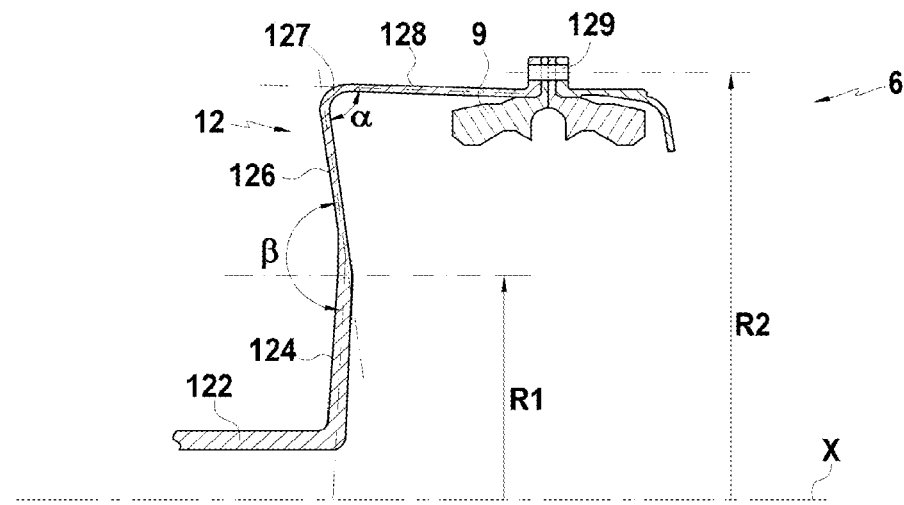

REDUCTION GEAR FOR RING GEAR RETENTION

TECHNICAL FIELD

The present disclosure relates to a reduction gear, particularly for a double flow turbomachine.

PRIOR ART

The new generations of double flow turbomachines, particularly those having a high bypass ratio, include a mechanical reduction gear for driving the shaft of a fan. Usually, the reduction gear has as its purpose to transform the rotation speed, called rapid, of the shaft of a power turbine into a slower rotation speed for the shaft driving the fan. Document FR3092889 thus shows an example of a known structure for a turbomachine reduction gear.

A reduction gear of this type comprises a central gear, called a sun gear, a ring gear and gears called plane gears, which engage between the sun gear and the ring gear. The planet gears are held by a frame called a satellite carrier. The sun gear, the ring gear and the planet carrier are planetary gears because their axes of revolution coincide with the longitudinal axis X of the turbomachine. The planet gears each have a different axis of revolution, said axes of revolution being equally distributed over the same operating diameter around the axis of the planetary gears. These axes are parallel to the longitudinal axis X.

There exist several reduction gear architectures. In the prior art of turbomachines with dual flow, the reduction gears are of the planetary or epicyclic type. There exist, in other similar applications, architectures called differential or compound.

In a planetary reduction gear, the planet carrier is fixed and the ring gear constitutes the output shaft of the device, which turns in the opposite direction of the sun gear.

In an epicyclic reduction gear, the ring gear is fixed and the planet carrier constitutes the output shaft of the device, which turns in the same direction as the sun gear.

In a differential reduction gear, no element is fixed in rotation. The ring gear turns in the direction opposite to the sun gear and to the planet carrier.

The reduction gears can be composed of one or more meshing stages. This meshing is provided in different manners, such as by contact, by friction or even by magnetic fields.

There exist several types of contact meshing, such as for example with straight teeth or herringbone teeth.

One recurring problem relates to the axial movement of ring gears, particularly under the influence of the centrifugal deformation of the ring gear carrier during operation.

The present invention thus intends to respond at least partially to this problem.

DISCLOSURE OF THE INVENTION

To this end, the present disclosure relates to a reduction gear for a turbomachine extending around an axis of rotation as defined in claim 1, comprising a ring gear connected to a ring gear carrier, the ring gear carrier extending between an internal shaft which extends around the axis and the ring gear, in which the ring gear carrier has, according to a section view along a plane including the axis, an internal segment, an external segment and a ring gear support, extending successively from the internal shaft until the ring gear support, the internal segment extends until a radius R1 with respect to the axis, the external segment forms an angle β with the internal segment, the ring gear support forms an angle α with the external segment, and is secured to the ring gear via a bolted connection accomplished at a nominal radius R2 with respect to the axis, characterized in that the ratio R1/R2 is comprised between 0.3 and 0.7, the angle α is comprised between 60° and 85°, and the angle β is comprised between 150° and 175°.

According to one example, the ring gear carrier comprises a curved or rounded segment forming a connection between the ring gear support and the external segment.

According to one example, the internal segment is rectilinear.

According to one example, the external segment is rectilinear.

According to one example, the ratio R1/R2 is comprised between 0.4 and 0.6.

According to one example, the angle α is comprised between 65° and 80°.

According to one example, the angle β is comprised between 155° and 170°.

The present disclosure also relates to a turbomachine comprising a reduction gear as presented previously.

The present disclosure further relates to an aircraft comprising a turbomachine of this type.

BRIEF DESCRIPTION OF THE DRAWINGS

The invention and its advantages will be better understood upon reading the detailed description given hereafter of different embodiments of the invention given by way of non-limiting examples.

FIG. 1 shows a general turbomachine structure.

FIG. 2 is a view of a turbomachine reduction gear.

FIG. 3 is a section view of a reduction gear according to one aspect of the invention.

FIG. 4 is a schematic view of the ring gear carrier of the reduction gear.

In all the figures, the common elements are labeled with identical numerical references.

DESCRIPTION OF THE EMBODIMENTS

FIG. 1 describes a turbomachine 1 which includes, in a conventional manner, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure spool (HP). The low-pressure compressor 1a and the low-pressure turbine 1e are connected by a low-pressure shaft 3 and form with it a low-pressure spool (BP).

The fan S is driven by a fan shaft 4 which is driven by the low-pressure shaft 3 by means of a reduction gear 6. This reduction gear is generally of the planetary or epicyclic type.

Although the description that follows relates to a reduction gear of the planetary or epicyclic type, it also applies to a mechanical differential gear in which the three components, which are the planet carrier 10, the ring gear 9 and the sun gear 7, are movable in rotation, the speed of rotation of one of the components depending in particular on the difference in speeds of the two other components.

The reduction gear 6 is positioned in the upstream portion of the turbomachine. A fixed structure including schematically, here, an upstream portion 5a and a downstream portion 5b which composes the engine casing or stator 5, is arranged so as to form an enclosure E surrounding the reduction gear 6. This enclosure E is formed here, upstream, by sealing elements such as gaskets at a bearing allowing the passage of the fan shaft 4, and downstream by sealing elements such as gaskets at the crossing of the low-pressure shaft 3.

FIG. 2 describes a reduction gear 6, which is also called a mechanical speed reducer, which can take the form of different architectures depending on whether certain parts are fixed or movable in rotation. At the input, the reduction gear 6 is connected to the low-pressure shaft 3, for example by means of splines 7a. Thus the low-pressure shaft 3 drives a planetary gear called the sun gear 7. Conventionally, the sun gear 7, of which the axis of rotation is congruent with that of the turbomachine X, drives a series of gears called planet gears 8, which are equally distributed over the same diameter around the axis of rotation X. This diameter is equal to double the operating space between axes between the sun gear 7 and the planet gears 8. The number of planet gears 8 is generally defined between three and seven for this type of application.

The planet gears 8 are held by a frame called a planet carrier 10. Each planet gear 8 revolves around its own axis Y, and meshes with the ring gear 9.

Two configurations are distinguished here.

In an epicyclic configuration, all the planet gears 8 drive in rotation the planet carrier 10 around the axis X of the turbomachine. The ring gear is fixed to the engine casing or stator 5 via a ring gear carrier 12 and the planet carrier 10 is attached to the fan shaft 4.

In a planetary configuration, all the planet gears 8 are retained by a satellite carrier 10 which is fixed to the engine casing or stator 5. Each planet gear retains the ring gear which is applied to the fan shaft 4 via a ring gear carrier 12.

Each planet gear 8 is mounted free in rotation by means of a bearing 11, for example of the rolling-element or hydrodynamic bearing type. Each bearing 11 is mounted on one of the axes 10b of the planet carrier 10 and all the axes are positioned with respect to one another by means of one or more structural frames 10a of the planet carrier 10. There exists a number of axes and of bearings equal to the number of satellites. For operational, assembly, monitoring, repair or replacement reasons the axes and the frame can be separated into several parts.

For the same reasons previously mentioned, the gear teeth of a reduction gear can be separated into several helices. In the example illustrated, we detail the operation of a reduction gear with several helices with a ring gear separated into 2 half-ring gears:

One front half-ring gear 9a, consisting of a rim 9aa and a half-fastening flange 9ab. The front helix of the gear teeth of the reduction gear are found on the rim 9aa. This helix meshes with that of the planet gear 8 which meshes with that of the sun gear 7.

One rear half-ring gear 9b consisting of a rim 9ba and a half-fastening flange 9bb. The rear helix of the gear teeth of the reduction gear are found on the rim 9ba. This helix meshes with that of the planet gear 8 which meshes with that of the sun gear 7.

The half-fastening flange 9ab of the front ring gear 9a and the half-fastening flange 9bb of the rear ring gear 9b form a fastening flange 9c of the ring gear.

The ring gear 9 is fastened to the ring gear carrier 12 by assembling the fastening flange 9c of the ring gear and the fastening flanges 12a of the ring gear carrier 12 by means of a bolted assembly for example.

The arrows of FIG. 2 describe the routing of the oil in the reduction gear 6. The oil arrives in the reduction gear 6 from the stator portion 5 in the distributor 13 by different means which will not be specified in this view, because they are specific to one or more types of architecture. The distributor is generally separated into two portions, each repeated by the same number of planet gears. The injectors 13a have the function of lubricating the gear teeth and the arms 13b have the function of lubricating the bearings. The oil is brought to the injector 13a to leave it by the end 13c in order to lubricate the gear teeth. The oil is also brought to the arm 13b and circulates via the supply opening 13d of the bearing. The oil then circulates through the axis into one or some of the buffer zone(s) 10c to then leave through the openings 10d in order to lubricate the bearings of the planet gears.

Described at present is an example of a structure of a reduction gear according to one aspect of the invention, with reference to FIGS. 3 and 4. FIG. 3 is a section view of an example of a reduction gear according to one aspect of the invention. FIG. 4 is a schematic view of a ring gear carrier of the reduction gear, emphasizing its geometry. In these figures, only the ring gear carrier and the ring gear of the reduction gear are shown.

Shown in these figures is a reduction gear 6 comprising a ring gear carrier 12 retaining a ring gear 9. The ring gear carrier 12 and the ring gear 9 are movable in rotation around an axis of rotation X-X.

The ring gear carrier 12 forms an arm from an internal shaft of the reduction gear 1 to an external section forming a support for the ring gear 9.

When considering a section view according to a plane including the axis of rotation X-X, the ring gear carrier 12 comprises an internal segment 124, an external segment 126 and a ring gear support 128, these elements extending successively from the axis of rotation X-X to the ring gear support.

The internal segment 124 extends radially or with an angle of inclination with respect to the radial direction with respect to the axis of rotation X-X, typically from a hub 122 of the ring gear carrier 12, the hub 122 typically being disposed around a fixed or movable shaft defining the axis of rotation X-X. The internal segment 124 extends until a first radius R1 with respect to the axis of rotation X-X. The internal segment 124 is typically linear.

The external segment 126 extends following the internal segment 124, from the first radius R1. The external segment 126 is not aligned with the internal segment 124. The inclination of the external segment 126 with respect to the internal segment 124 forms and angle β, comprised between 150° and 175°, or for example between 155° and 170°, or even between 160° and 170° or even between 160° and 165°.

The external segment 126 is typically linear.

The ring gear support 128 extends following the external segment 126, and comprises an end to which the ring gear 9 is secured, typically by bolting. Thus a through recess formed in the ring gear support 128 and in the ring gear 9 for accomplishing the bolted connection between these two elements is designated by 129.

The ring gear support 128 forms an angle α with respect to the external segment 126. The angle α is comprised between 60° and 85°, or between 65° and 80°, or between 70° and 75°. The ring gear support 128 can be parallel or not with respect to the axis of rotation X-X. The ring gear support 128 can for example be rectilinear.

The ring gear support 128 defines a support zone in which is positioned the ring gear 9. This support zone is positioned at a second radius R2 with respect to the axis of rotation X-X. The radius R2 is thus the radius of implantation of the bolted connection between the ring gear support 128 and the ring gear 9, i.e. the nominal radius of the bore 129 in the case of the example illustrated in FIG. 4.

The ring gear carrier 12 is such that the ratio between the radii R1 and R2 is comprised between 0.3 and 0.7, or for example between 0.35 and 0.65, or even between 0.4 and 0.6, or between 0.45 and 0.55.

The junction between the external segment 126 and the ring gear support 128 is typically formed by a curved or rounded segment 127, which allows in particular avoiding the formation of sharp edges, and thus improves the mechanical strength of the assembly.

The proposed geometry, with the combination of the parameters R1, R2, α and β allows improving the mechanical strength of the ring gear carrier 12, and in particular limiting or even eliminating the axial movement of the ring gear under the influence of the centrifugal force during operation. In fact, conventional reduction gears have a problem linked to the deformation of the ring gear carrier and therefore to the axial movement of the ring gear due to the centrifugal effect, which causes large stresses on the gear teeth of the reduction gear. The reduction gear 6 as proposed allows responding to the problem.

The reduction gear 6 is for example a reduction gear of the planetary type, with a rotating ring gear, single stage or two-stage, with rolling element bearings or hydrodynamic bearings.

The reduction gear 6 as proposed can in particular be employed in a turbomachine such as a turbojet, for example a turbomachine as shown with reference to FIG. 1, which can in particular be employed in an aircraft.

Although the present invention has been described by referring to specific embodiments, it is obvious that modifications and changes can be carried out on these examples without departing from the general scope of the invention as defined by the claims. In particular, the individual characteristics of the different embodiments illustrated/mentioned can be combined into additional embodiments. Consequently, the description and the drawings should be considered in an illustrative, rather than a restrictive sense.

It is also obvious that all the features described with reference to a method are transposable, alone or in combination, to a device, and conversely, all the features described with reference to a device are transposable, alone or in combination, to a method.

The invention claimed is:

1. A reduction gear for a turbomachine (6) extending around an axis (X-X) of rotation, comprising a ring gear (9) connected to a ring gear carrier (12), the ring gear carrier (12) extending between an internal shaft (122) which extends around the axis (X-X) of the ring gear (9),
wherein
the ring gear carrier (12) has, according to a section view along a plane including the axis (X-X), an internal segment (124), an external segment (126) and a ring gear support (128), extending successively from the internal shaft (122) until the ring gear support (128),
the internal segment (124) extends until a radius R1 with respect to the axis (X-X),
the external segment (126) forms an angle β with the internal segment (124),
the ring gear support (128) forms an angle α with the external segment (126) and is secured to the ring gear (9) via a bolted connection accomplished at a nominal radius R2 with respect to the axis (X-X), characterized in that the ratio R1/R2 is comprised between 0.3 and 0.7, and in that the angle α is comprised between 60° and 85°, and the angle β is comprised between 150° and 175°.

2. The reduction gear (6) according to claim 1, wherein the ring gear carrier (12) comprises a rounded segment (127) forming a connection between the ring gear support (128) and the external segment (126).

3. The reduction gear (6) according to claim 1, wherein the internal segment (124) is rectilinear.

4. The reduction gear (6) according to claim 1, wherein the external segment (126) is rectilinear.

5. The reduction gear (6) according to claim 1, wherein the ratio R1/R2 is comprised between 0.4 and 0.6.

6. The reduction gear (6) according to claim 1, wherein the angle α is comprised between 65° and 80°.

7. The reduction gear (6) according to claim 1, wherein the angle β is comprised between 155° and 170°.

8. A turbomachine comprising a reduction gear (6) according to claim 1.

9. An aircraft comprising a turbomachine according to claim 8.

* * * * *